(12) United States Patent
Thornton et al.

(10) Patent No.: US 7,206,256 B1
(45) Date of Patent: Apr. 17, 2007

(54) PRESSURE COMPENSATED COMPOSITE POLYMER OUTBOARD SENSOR ASSEMBLY

(75) Inventors: Joseph S Thornton, Austin, TX (US); Christopher Pearson Thornton, Austin, TX (US); Shawn Lawrence Arnett, Austin, TX (US)

(73) Assignee: Texas Research International, Inc., Austin, TX (US)

( * ) Notice: Subject to any disclaimer, the term of this patent is extended or adjusted under 35 U.S.C. 154(b) by 283 days.

(21) Appl. No.: 11/058,895

(22) Filed: Feb. 16, 2005

(51) Int. Cl.
*G01V 1/38* (2006.01)
(52) U.S. Cl. .................................... 367/130
(58) Field of Classification Search ............... 367/130, 367/106, 15, 167, 172, 18
See application file for complete search history.

(56) References Cited

U.S. PATENT DOCUMENTS

| | | | |
|---|---|---|---|
| 4,298,964 A | | 11/1981 | Warnshuis, Jr. |
| 4,479,690 A | * | 10/1984 | Inouye et al. ............... 439/275 |
| 4,531,468 A | * | 7/1985 | Simon ....................... 367/167 |
| 5,452,266 A | | 9/1995 | Carter |
| 5,909,408 A | | 6/1999 | Warnan et al. |
| 6,046,963 A | | 4/2000 | Glenning |
| 6,088,296 A | | 7/2000 | Seaman et al. |
| 6,683,819 B1 | | 1/2004 | Estaphan et al. |

* cited by examiner

*Primary Examiner*—Dan Pihulic
(74) *Attorney, Agent, or Firm*—M.A. Ervin & Associates; Michael A. Ervin (57) ABSTRACT

The use of a pressure compensation system and composite polymer materials results in a new type of outboard sensor assembly, of the type used to monitor the status and location of towed array systems from boats. The inventive system is lower in cost, easier to manufacture in quantity, lighter weight, less likely to leak, and with a lower failure rate than conventional systems.

18 Claims, 11 Drawing Sheets

PRESSURE COMPENSATED COMPOSITE POLYMER OUTBOARD SENSOR ASSEMBLY

TECHNICAL FIELD

This invention relates to the general field of towed array systems on submarines and more specifically to outboard sensor assemblies that monitor the status and location of such towed array systems.

BACKGROUND

Submarine sonar systems include a towed sonar array that is deployed behind a moving submarine. The sonar sensor part of the towed array may be more than 1000 yards behind the submarine. This enables the total sonar system to detect other vessels and through triangulation establish an accurate distance to the detected vessel.

When the towed array is retrieved into the submarine it passes through an outboard sensor assembly (OSA), usually in the vertical stabilizer of the submarine. The outboard sensor assembly contains electronic instrumentation necessary to monitor the passage of the towed array during deployment, towing, and retrieval and to relay that information to submarine personnel.

Due to the corrosive environment of the ocean the housing of outboard sensor assemblies have been machined from Monel, an alloy containing nickel, copper, iron and other alloys, with nickel being the primary component, followed by copper and then iron. The resulting outboard sensor assembly is relatively difficult to machine, expensive, and heavy. The weight is important because divers often do repair of an outboard sensor assembly underwater while the submarine is in port. The Monel housing surrounds an interior tube composed of either Monel or polymer through which the towed array passes. A common failure mode of this design is electrical shorting caused by seawater leaking into the interior of the Monel housing where electronic components are contained. These failures and the combination of the weight and costs of the system results in high operation and support costs of replacing failed units during submarine maintenance periods.

There is an unmet need then for a new outboard sensor assembly, one that is lower cost, easier to manufacture in quantity, lighter weight, less likely to leak, and with a lower failure rate. The instant invention to be described meets those needs.

SUMMARY

The needs discussed are addressed by the instant invention.

One aspect of the instant invention is an apparatus for monitoring deployment of a towed array from a boat including at least a housing of a composite polymer; an interior passageway for movement of the towed array; and a pressure compensation bladder having an exterior surface and an interior surface wherein the pressure compensation bladder is positioned between the housing and the interior passageway.

Another aspect of the instant invention also includes the use of a fluid medium filling the housing and the interior passageway and surrounding the exterior surface of the pressure compensation bladder.

Another aspect of the instant invention also includes at least one acoustic sensor mounted within the apparatus to detect the passage of the towed array.

Another aspect of the instant invention also includes at least one electromagnetic sensor mounted within the apparatus to detect the passage of the towed array.

To insure that a clear and complete explanation is given to enable a person of ordinary skill in the art to practice the invention a specific example will be given involving applying the invention to an outboard sensor assembly for a towed array system on a military submarine. It should be understood though that the inventive concept could apply to other pressure compensation systems and the specific example is not intended to limit the inventive concept to the example application.

DETAILED DESCRIPTION

Figure 1:
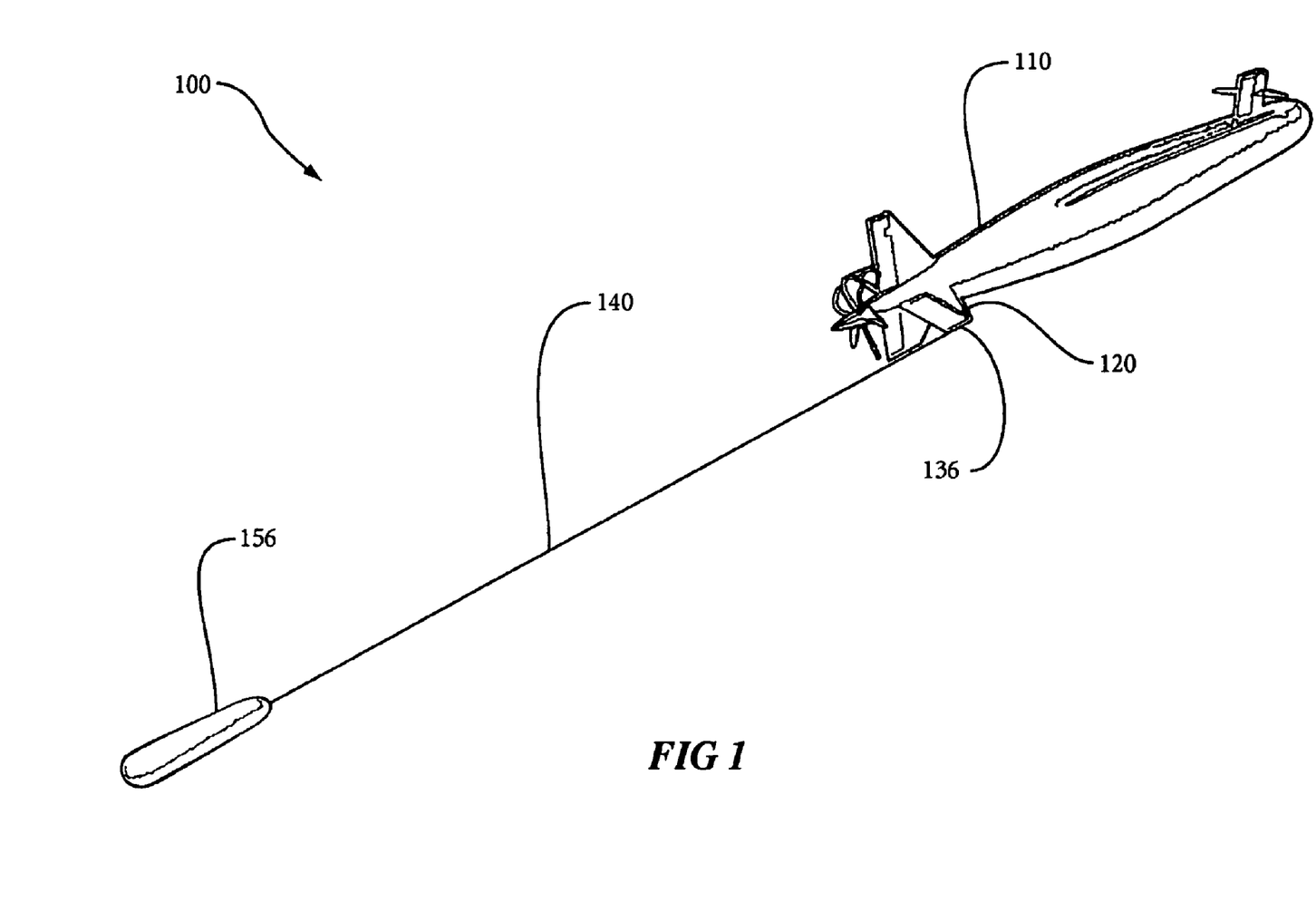
FIG. 1 is a representation of a towed array system trailing behind a submarine.

FIG. 1 represented generally by the numeral 100 illustrates a submarine 110 with a towed array sensor system 156 and cable 140. The towed array can be a sophisticated sonar system more than 1000 yards behind the submarine that can detect other vessels and by means of the distance from the submarine establish through triangulation an accurate distance to the detected vessel. The towed array must be retrieved into the submarine through outboard sensor assembly 136 attached to vertical stabilizer 120 before the submarine can make any sophisticated maneuvers.

Figure 2:
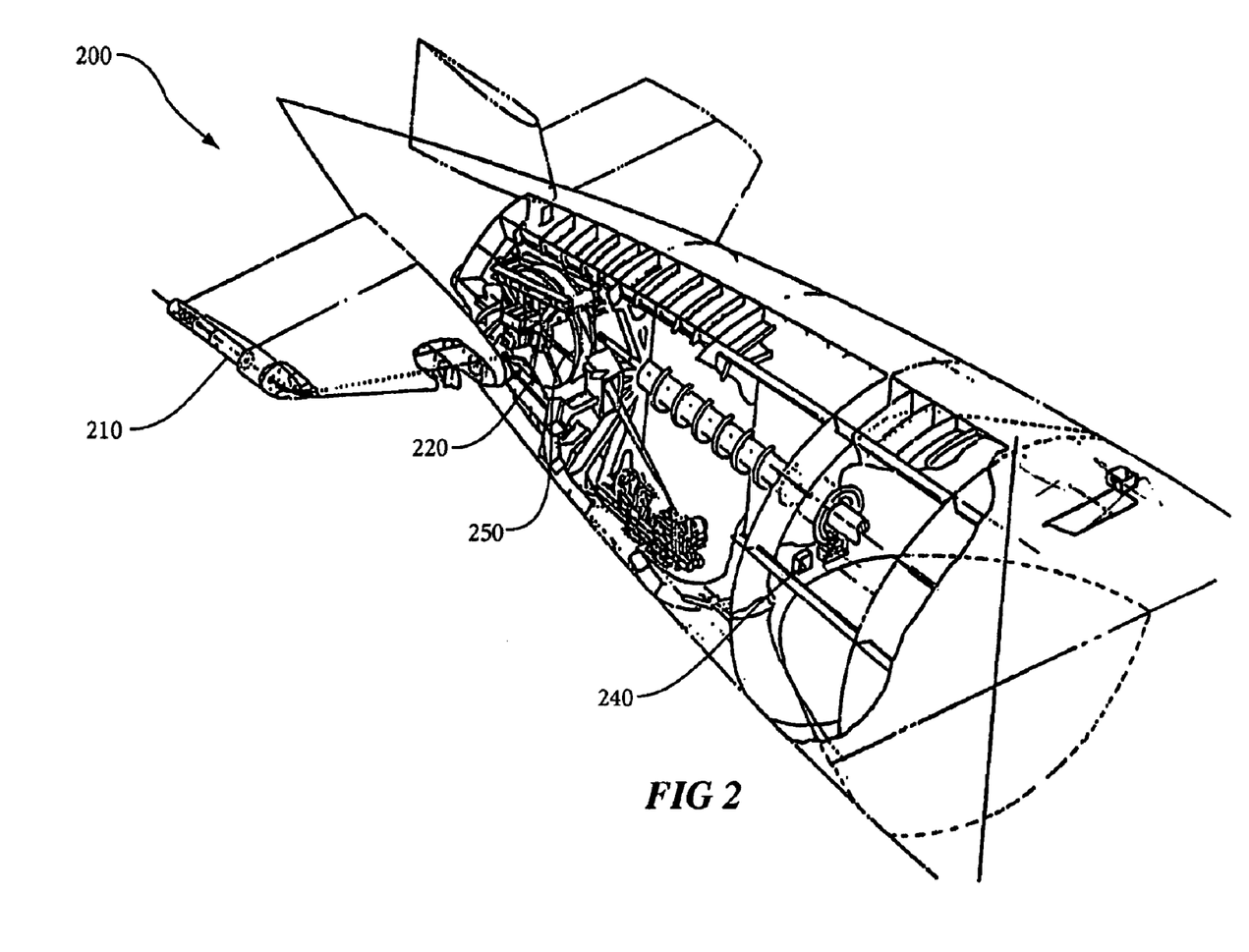
FIG. 2 is a representation of an outboard sensor assembly for a towed array system and the internal cable and drum system used for deployment and retrieval.

FIG. 2 shows an outboard sensor assembly (OSA) and related components, represented generally by the numeral 200. The OSA 210 is located in the vertical stabilizer of the submarine, in a free flooded area exposed to ocean water and water pressure. The OSA senses the deployment and retrieval of the towed array and indicates when the guide tube is empty or full. The OSA performs the vital function of reporting the position of the towed array during deployment, towed operations, and retrieval. When a submarine is about to begin any significant maneuvers the towed array is reeled through the OSA and into an aft compartment of the submarine. The assembly contains acoustic sensor elements that detect when the towed array passes through the OSA and notify the crew when the towed array is safely on board. As the towed array is reeled in it passes through guide tube assembly 220 and the bulk of the cable is stored on cable drum 250. A remote indicator panel 240 provides information to the crew as to the towed array status.

Figure 3:
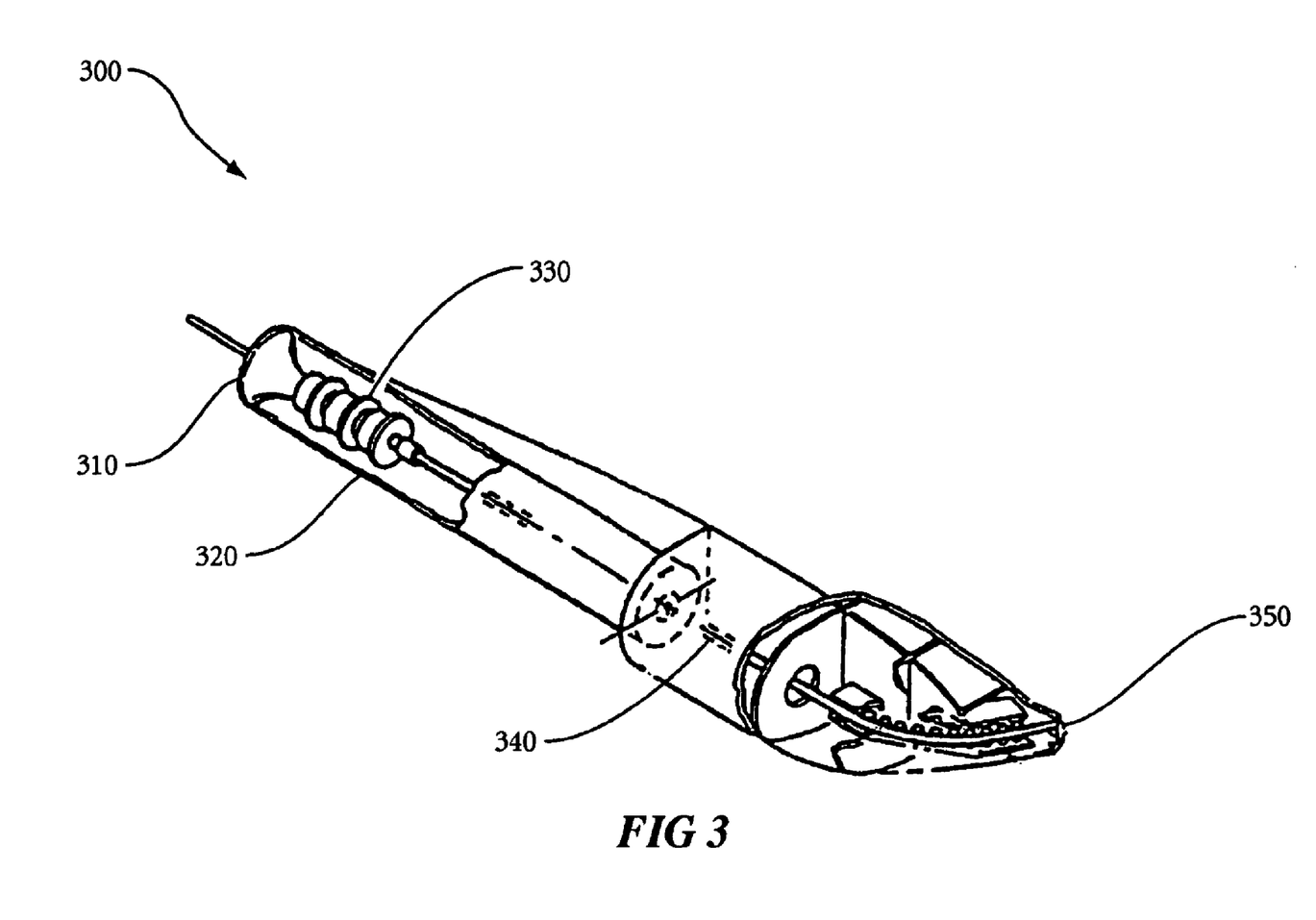
FIG. 3 is a schematic of an outboard sensor assembly located on the vertical stabilizer.

FIG. 3 is a more detailed schematic of an OSA in the vertical stabilizer, represented generally by the numeral 300. The elements of sensor assembly 330 are attached to bellmouth 310, through which the towed array assembly is deployed or retrieved. The current conventional OSA technology devices have a metal housing of Monel. Interior passageways, partly Monel and partly polymer, form the interior passageway through which the towed array is deployed. A common failure mode of these devices is electrical short-circuiting caused by degradation of watertight seals and subsequent high pressure seawater flooding of the interior cavity of the housing.

Figure 4:
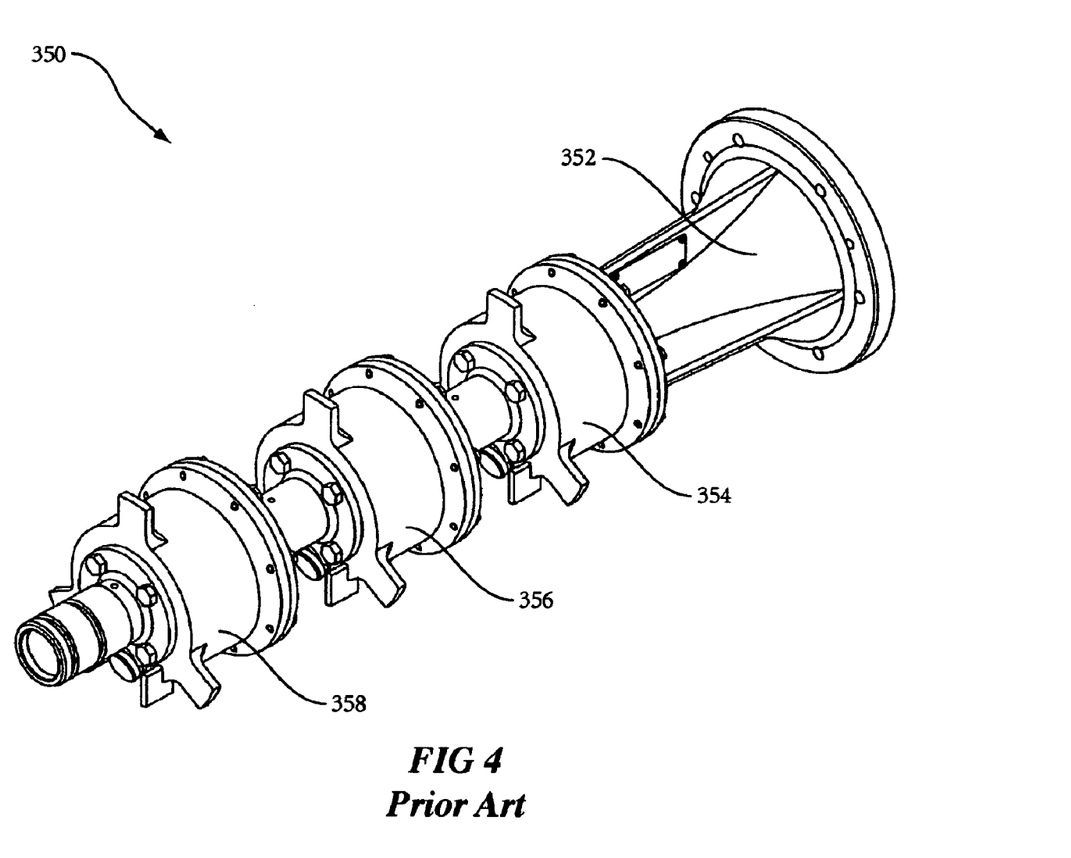
FIG. 4 is a more detailed view of a prior art outboard sensor assembly.

FIG. 4, represented generally by numeral 350 is a rendering of a complete prior art outboard sensor assembly. A bellmouth assembly 352 faces out into ocean water. Attached is the electromagnetic (EM) sensor module assembly 354, attached to the aft sensor module assembly 356, which is further attached to the forward sensor module assembly 358. Each of the sub-assemblies contains (not shown) expensive acoustic transmitters and receivers with associated electronics to provide either electro-acoustic or electromagnetic sensing functionality. All of the housings shown are machined from Monel stock. The Monel material is expensive and requires expensive fabrication techniques to manufacture. The design of the instant invention (to be shown) maintains Monel bellmouth 352 but significantly changes modules 354,356, and 358.

An improved OSA design that is the heart of the instant invention includes the embodiments of replacing the expensive Monel with a lower cost and easier to manufacture composite polymer housing, replacing high cost acoustic transmitters and receivers with lower cost piezoelectric ceramic acoustic sensors and using a passive pressure compensation system consisting of an oil-filled housing and a bladder whose interior is vented to seawater pressure. By maintaining equal pressure at all seawater depths the driving force of seawater on seals is maintained at zero, thus eliminating the seawater leakage failure mechanism.

Figure 5:
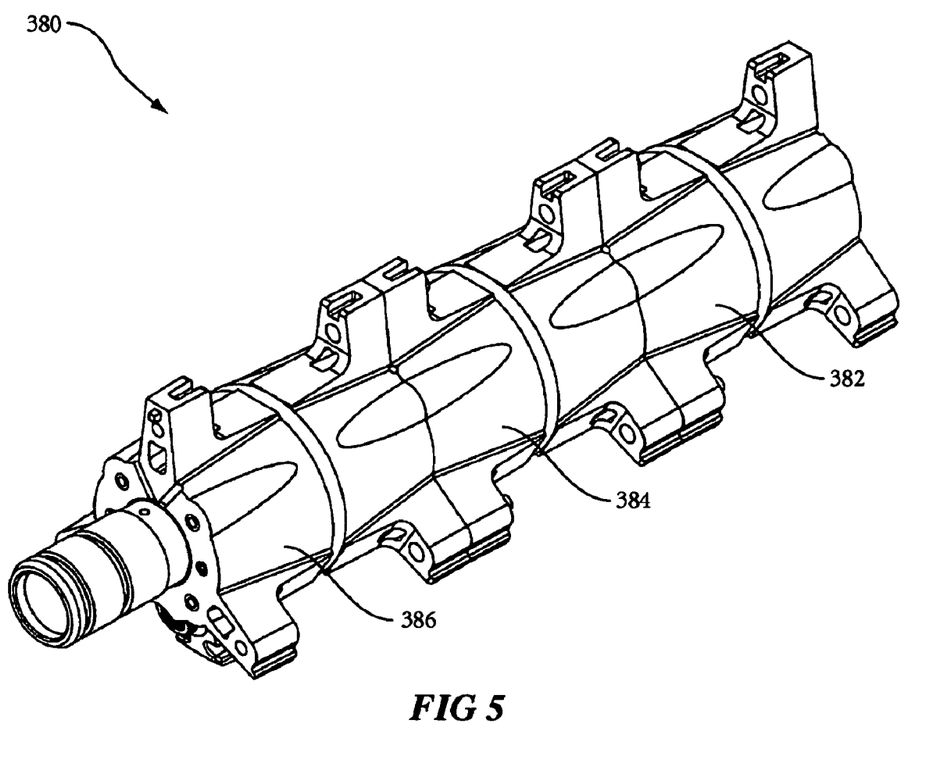
FIG. 5 is an exterior view of the outboard sensor assembly of the instant invention.

FIG. 5, represented generally by the numeral 380 is a rendering depicting the improved invention. Not shown in this figure is the bellmouth assembly (354 of FIG. 4), which is unchanged in this invention. Section 382 is the electromagnetic (EM) sensor module, which is attached to the aft sensor module 384, which is further attached to the forward sensor module 386. The materials of construction of the three modules is a composite polymer which can be machined, injection molded, hand formed, spun cast, conventionally cast, or other polymer manufacturing techniques, significantly lowering weight and cost when compared to the prior art Monel construction. The use of any of these manufacturing techniques is anticipated in the instant invention. A preferred technique is injection molding. A number of composite polymers, including those made from the polymers polyphenylene sulfide, polypropylene, polybutylene terephthalate, nylon 6/6, nylon 11, nylon 12, and polyphenylene oxide have good resistance to seawater conditions and can lower weight and cost. Any of these polymers are anticipated by the instant invention. These polymers can be reinforced by a number of reinforcing agents such as glass beads or fibers. A preferred reinforcing agent is a long glass fiber.

Figure 6:
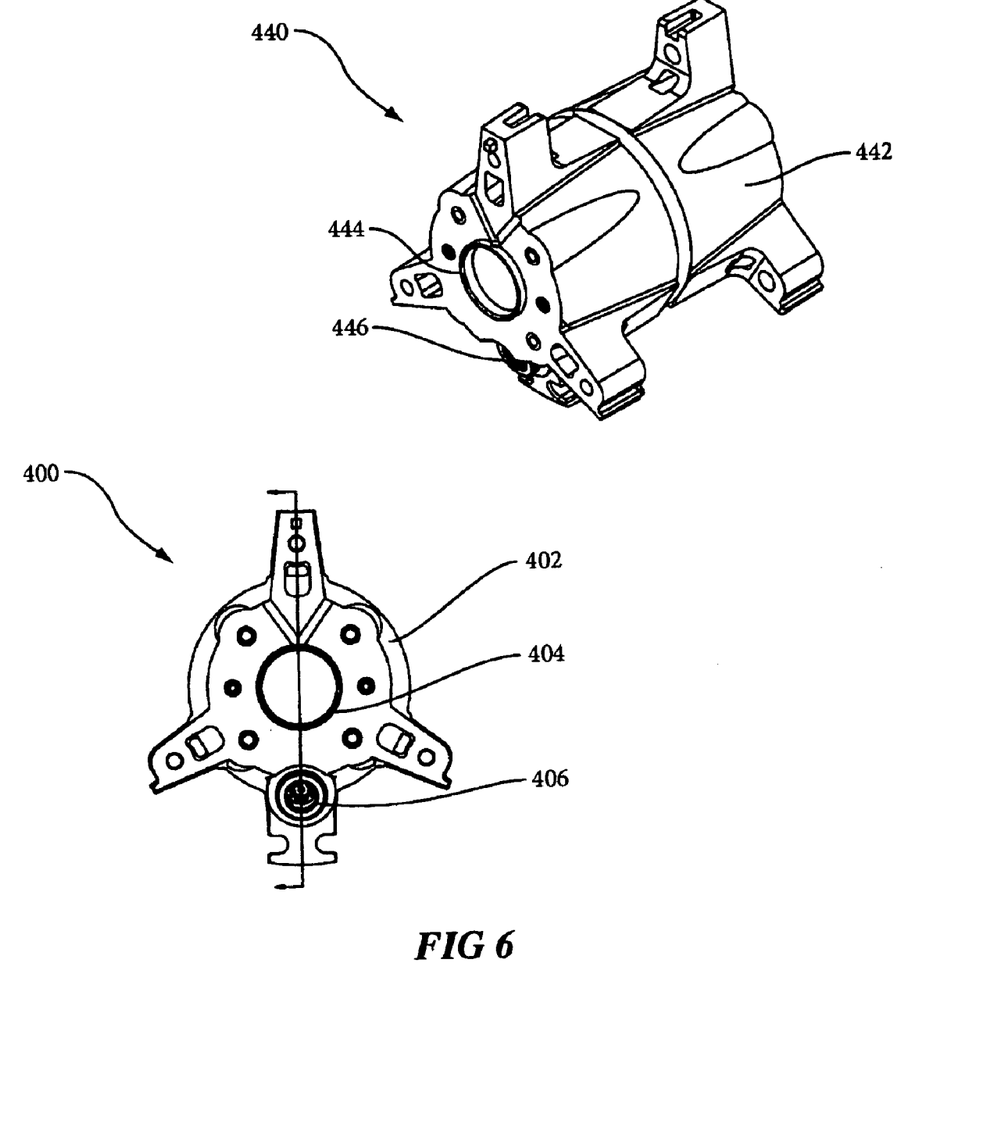
FIG. 6 is a rendering of the aft acoustic sensor module assembly.

FIG. 6 is a more detailed look of the aft sensor module—a front view 400, and perspective view 440. Internal cutaway perspectives are shown later. The housing 402, 442 is manufactured from a molded or cast composite polymer. The interior tube 404,444 is a polymer. A number of polymer materials are possible for interior tube 404,444. A preferred polymer is polycarbonate. The central tube 404,444 is the passageway for the towed array as it is being deployed out to sea or being retrieved back into the boat. Acoustic sensors (not shown) are located on either side of the interior tube 404,444 and are used to detect passage of the main body of the towed array.

Figure 7:
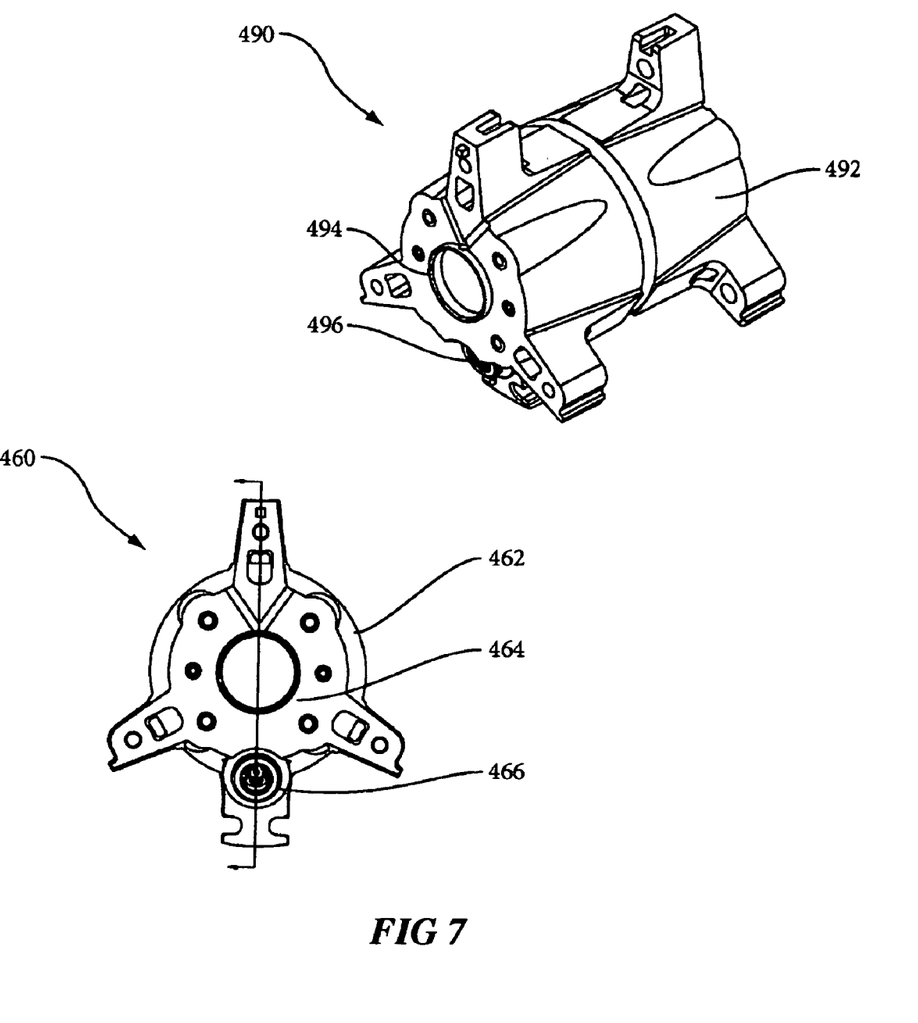
FIG. 7 is a rendering of the electromagnetic (EM) sensor module assembly.

FIG. 7 is a more detailed look of the electromagnetic (EM) sensor module—a front 460 and perspective view 490. Internal cutaway perspectives are shown later. The housing 462, 492 is manufactured from a molded or cast composite polymer. The interior tube 464,494 is polymer. A number of polymer materials are possible for interior tube 464,494. A preferred polymer is polycarbonate. The central tube 464, 494 is the passageway for the towed array as it is being deployed out to sea or being retrieved back into the boat. Electromagnetic sensors (not shown) located on either side of the central tube 464,494 are used to detect passage of the main body of the towed array.

Figure 8:
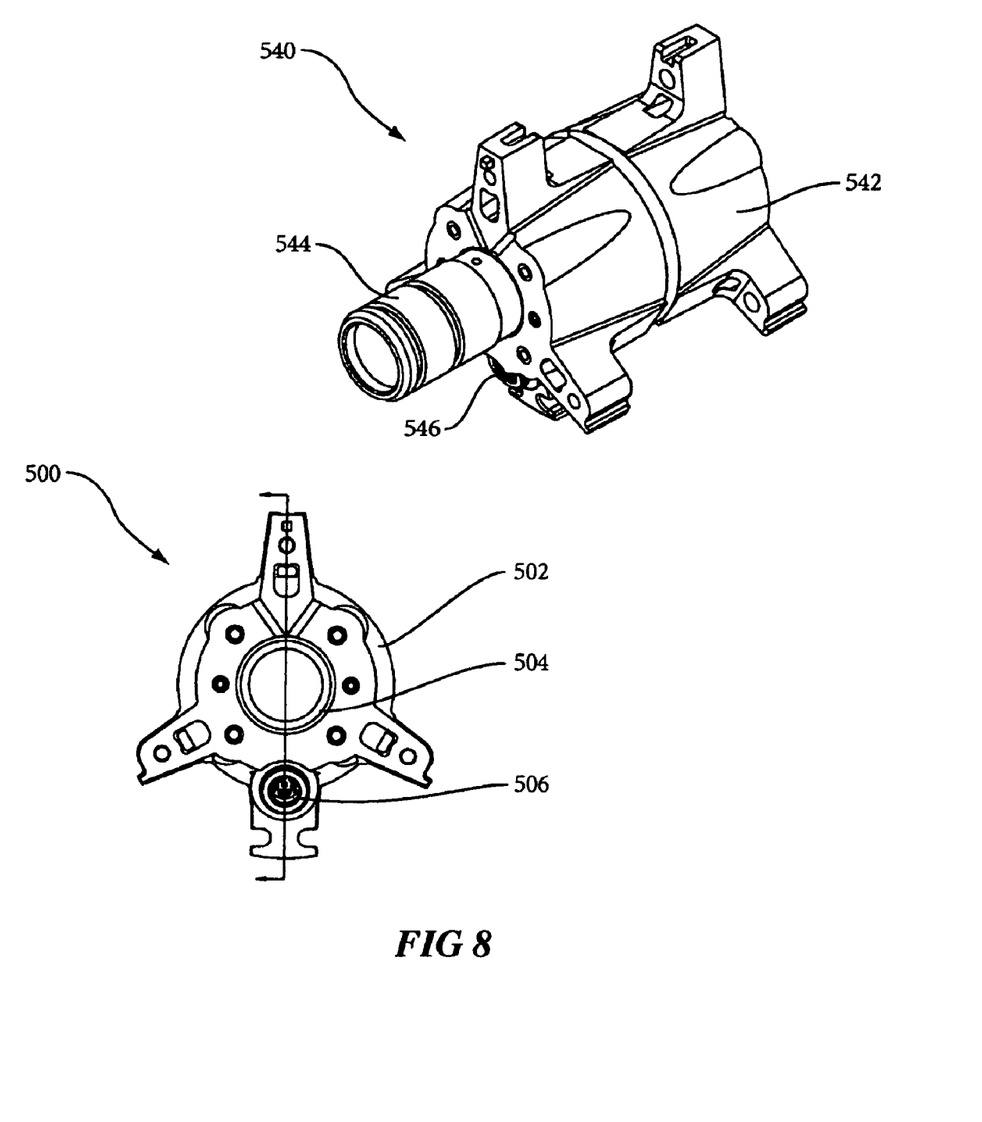
FIG. 8 is a rendering of the forward acoustic sensor module assembly.

FIG. 8 is a more detailed view of the forward sensor module—a front 500 and perspective view 540. Internal cutaway perspectives are shown later. The housing 502, 542 is manufactured from a molded or cast composite polymer. The interior tube 504,544 is polymer. A number of polymer materials are possible for interior tube 504,544. A preferred polymer is polycarbonate. The central tube 504,544 is the passageway for the towed array as it is being deployed out to sea or being retrieved back into the boat. Acoustic sensors (not shown) are located on either side of the interior tube 504,544 and are used to detect passage of the main body of the towed array.

Figure 9:
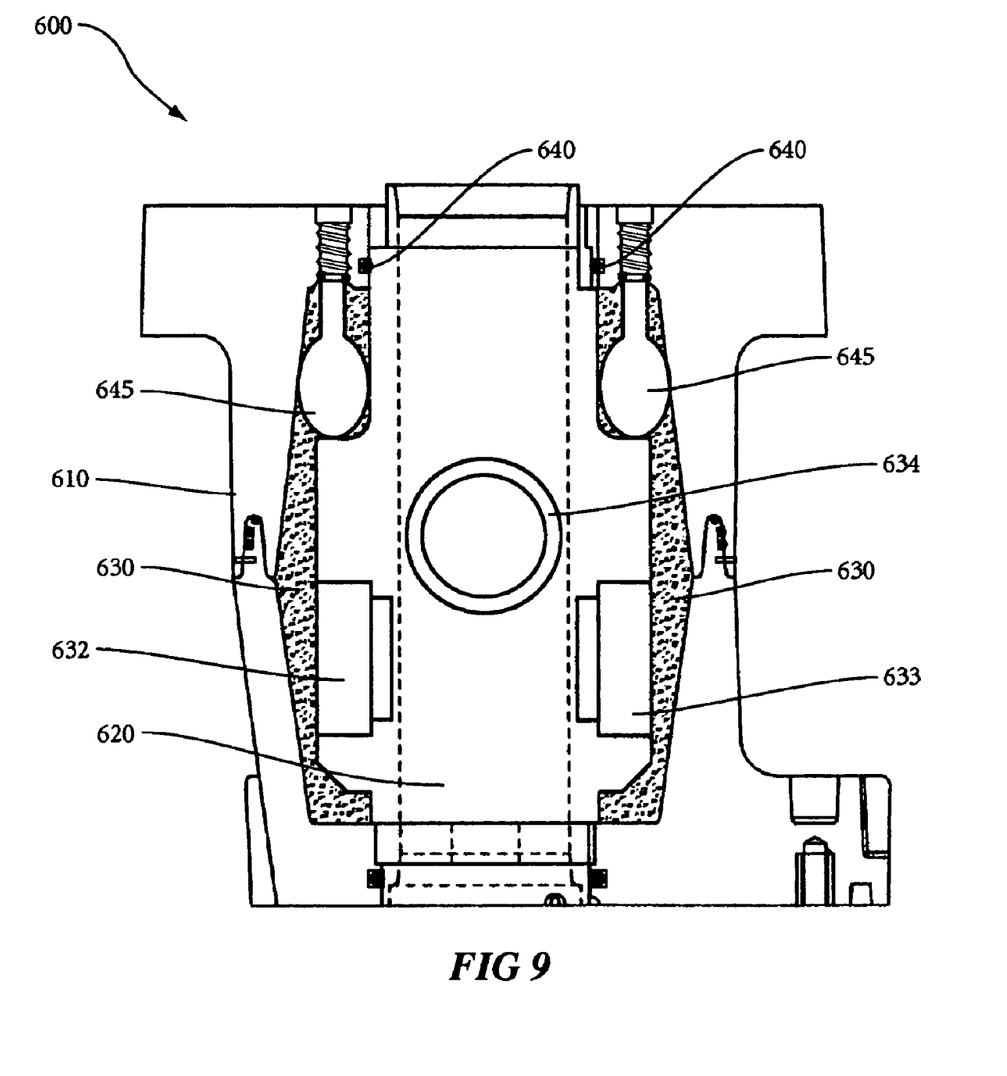
FIG. 9 is a schematic of the aft or forward acoustic sensor module assembly showing the oil and pressure compensation system placement.

The interior passageway of the electromagnetic sensor module must be a polymer to allow EM sensors to detect the passage of the towed array body through the interior passageway. The interior passageways of the forward and aft sensor modules could technically be metal but for the reasons discussed earlier regarding the need for lighter weight, are polymer in the instant invention. A common failure mode of the prior art designs of outboard sensor assemblies is a failure of the seals between the Monel housing and the interior polymer passageway tube. These failures occur as large differentials develop between pressures inherent from the pressure of deep ocean water and the lower pressure of the interior volume between the interior tube and the housing. This interior volume contains the sensor elements of the system. To address this issue a bladder and oil pressure compensation system is part of the instant invention. FIG. 9 is a cutaway schematic showing the bladder oil aspect of the invention. The module shown generally by the numeral 600 is representative of either the forward or aft acoustic sensor module. An exterior composite polymer shell 610 surrounds a central polymer passageway 620. As mentioned previously the housing is exposed to the ocean and the pressures of the surrounding seawater. O-ring seals 640 seal the interface between the housing and the interior polymer passageway. A pressure compensation system based on an interior oil and bladder system is shown in the cutaway. Oil 630 fills a volume surrounding the interior polymer passageway. An inflatable bladder 645 is shown positioned in the oil system and in communication through the housing directly to the ocean environment and thereby to ocean pressure. Thus as the module descends or ascends through ocean depths the bladder expands or shrinks and maintains an interior oil pressure equal to the exterior pressure—eliminating any pressure differential on O-rings 640. A number of oils could be used and are anticipated in this invention. A desirable feature of the oil is that it be non-reacting, non-corroding and non-plasticizing. A preferred oil is a castor oil.

Acoustic sensors such as the one numbered 633 are used to detect the passage of the various parts of the towed array through the central passageway. A number of different types of acoustic sensors have been used for this type of application and the use of any of them is anticipated for this invention. Shown is a preferred embodiment of piezoelectric ceramic acoustic sensors 632,633,634 positioned around interior tube 620. A fourth sensor (not shown) would be located behind sensor 634 on the opposite side of the central passageway 620. Piezoelectric ceramic acoustic sensors are low cost and reliable and can perform the dual function of sending or receiving acoustic signals. Thus one of the two sensors 632 can send an acoustic signal that passes across central passageway 620 and sensor 633 on the opposite side can act as the actual sensor to measure the strength of the signal. The signal varies significantly as various parts of the towed array pass through the passageway.

Figure 10:
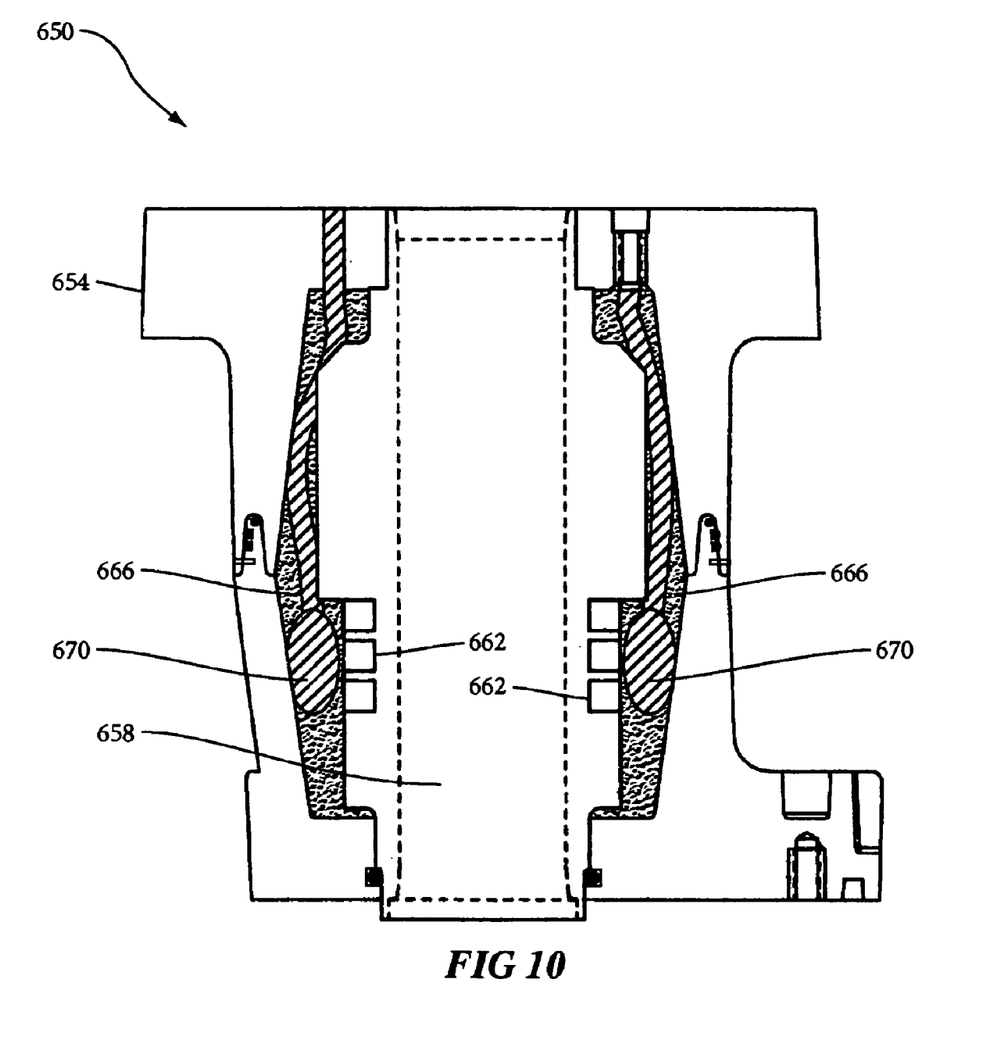
FIG. 10 is a schematic of the EM acoustic sensor module assembly showing the oil and pressure compensation system placement.

The electromagnetic (EM) sensor module, which has a somewhat different design, also has an oil and bladder system shown generally by the numeral 650 in cutaway schematic FIG. 10. A composite polymer housing 654 again surrounds an interior polymer passageway 658 with an electromagnetic (EM) sensor system 662. The EM sensor 662 is shown as a cutaway and can be implemented as a series of coils wrapped around interior passageway 658. A pressure compensation system consists of oil filled volume 666 with an inflatable bladder 670 in communication with ocean pressure through connection 672. As the module descends or ascends through ocean depths the bladder expands or shrinks and maintains an interior oil pressure equal to the exterior pressure—eliminating any pressure differentials.

Figure 11:
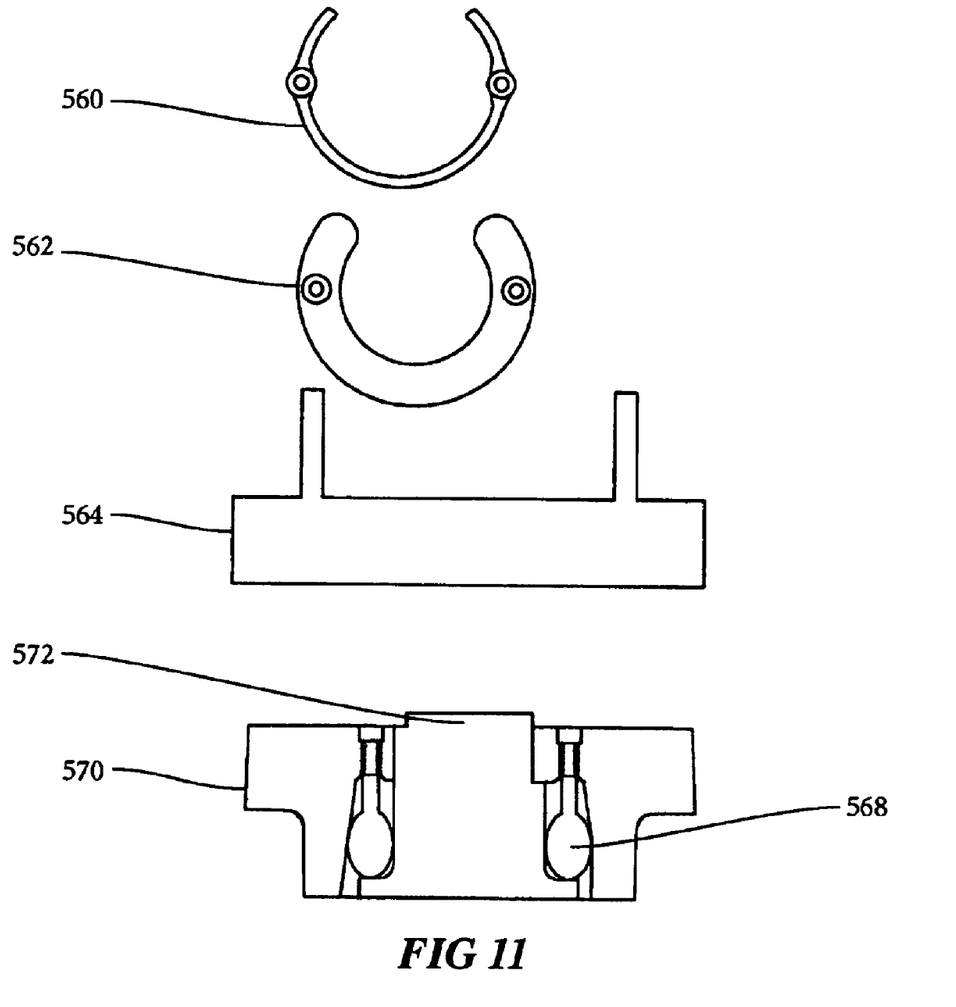
FIG. 11 is a schematic of the pressure compensation bladder of the instant invention.

The bladder of the bladder and oil pressure systems of FIG. 9 is shown in FIG. 11. The bladder shown in FIG. 9 is a cutaway view but the bladder oil system actually extends around and almost surrounds the central passageway. The bladder un-inflated is shown as top view 560. When inflated under higher ocean pressure the bladder is shown as top view 562. A side view of the bladder is shown as 564. A top section cutaway 570 of an acoustic sensor module similar to those in FIG. 9 shows how the bladder 568 is placed in the module in the volume between the outer composite polymer shell 570 and the inner polymer passageway 572.

The instant invention described herein results in a significantly improved outboard sensor assembly for towed array systems that is lower cost, easier to manufacture in quantity, lighter weight, and with a lower failure rate due to the pressure compensation system. Although the examples have focused on a submarine application the invention could be employed in any boat that deploys a towed array behind it at ocean depths.

The invention claimed is:

1. An apparatus for monitoring deployment of a towed array from a boat comprising:
   a. a housing of a composite polymer;
   b. an interior passageway for movement of said towed array; and
   c. a pressure compensation bladder having an exterior surface and an interior surface wherein said pressure compensation bladder is positioned between said housing and said interior passageway.

2. The apparatus of claim 1 further comprising a fluid medium filling the space between said housing and said interior passageway and surrounding exterior surface of said pressure compensation bladder.

3. The apparatus of claim 1 wherein said pressure compensation bladder is mounted so that said interior surface is in communication with the environment exterior to said apparatus.

4. The apparatus of claim 2 wherein said fluid medium is an oil.

5. The apparatus of claim 4 wherein said oil is a castor oil.

6. The apparatus of claim 1 wherein said interior passageway is prepared from a polymer.

7. The apparatus of claim 6 wherein said polymer is a polycarbonate.

8. The apparatus of claim 1 further comprising an acoustic sensor mounted within apparatus to detect the passage of the towed array.

9. The apparatus of claim 8 wherein said acoustic sensor is a piezoelectric ceramic acoustic sensor.

10. The apparatus of claim 1 further comprising an electromagnetic sensor mounted within apparatus to detect the passage of the towed array.

11. The apparatus of claim 1 further comprising a proximity sensor mounted within apparatus to detect the passage of the towed array.

12. The apparatus of claim 1 wherein the apparatus is divided into multiple segments.

13. The apparatus of claim 12 wherein the apparatus is divided into three sub-segments.

14. The apparatus of claim 13 wherein said sub-segments comprise a forward acoustic sensor module assembly, an aft acoustic sensor module assembly, and an electromagnetic sensor module assembly.

15. The apparatus of claim 1 wherein said housing of a composite polymer is made of a reinforced polymer.

16. The apparatus of claim 15 wherein said reinforced polymer is reinforced by the addition of glass.

17. The apparatus of claim 15 wherein reinforced polymer is reinforced by the addition of long glass fibers.

18. The apparatus of claim 15 wherein the polymer of said reinforced polymer is selected from the group consisting of polyphenylene sulfide, polypropylene, polybutylene terephthalate, nylon 6/6, nylon 11, nylon 12, and polyphenylene oxide.

* * * * *